(12) United States Patent
Bodine et al.

(10) Patent No.: US 6,177,180 B1
(45) Date of Patent: Jan. 23, 2001

(54) COMPOSITE CONSTRUCTION BOARD WITH LOAD BEARING PROPERTIES

(75) Inventors: Darryl C. Bodine, Lancaster; William C. Dorsey, Conestoga, both of PA (US)

(73) Assignee: Armstrong World Industries, Inc., Lancaster, PA (US)

(*) Notice: Under 35 U.S.C. 154(b), the term of this patent shall be extended for 0 days.

(21) Appl. No.: 08/867,502

(22) Filed: Jun. 2, 1997

(51) Int. Cl.[7] .................................................. B32B 27/00
(52) U.S. Cl. ........................ 428/223; 428/319.3; 428/332; 428/500; 52/309.8; 181/290
(58) Field of Search ........................... 428/223, 500, 428/522, 510, 319.7, 319.9, 319.3, 332; 52/144, 404.1, 309.14, 309.8, 309.9, 408; 181/290, 284, 287, 208; 442/395, 396, 399

(56) References Cited

U.S. PATENT DOCUMENTS

| | | | |
|---|---|---|---|
| 1,856,603 | * | 5/1932 | Upson . |
| 1,856,633 | * | 5/1932 | Harney . |
| 3,531,367 | * | 9/1970 | Karsten ............................ 161/160 |
| 3,895,087 | * | 7/1975 | Ottinger et al. ................... 264/46.2 |
| 4,019,296 | * | 4/1977 | Jochmann ............................ 52/268 |
| 4,335,802 | * | 6/1982 | Kirschner ............................ 181/290 |
| 4,476,183 | * | 10/1984 | Holtrop et al. ...................... 428/286 |
| 4,818,603 | * | 4/1989 | Mueller ............................ 428/316.6 |
| 5,149,579 | * | 9/1992 | Park et al. ......................... 428/213 |
| 5,153,388 | * | 10/1992 | Wittenmayer et al. .............. 181/290 |
| 5,164,258 | * | 11/1992 | Shida et al. ....................... 428/319.3 |
| 5,280,689 | * | 1/1994 | Mill .................................... 52/309.9 |
| 5,373,674 | * | 12/1994 | Winter, IV .......................... 52/309.9 |

* cited by examiner

*Primary Examiner*—Paul Thibodeau
*Assistant Examiner*—Kevin R Kruer
(74) *Attorney, Agent, or Firm*—Womble Carlyle Sandridge & Rice PLLC

(57) ABSTRACT

A composite board that can be fastened by fastening means which goes through the board from one face to the op site face, said composite board providing a retraction resistance of at least 15 pounds. The board comprises a polymer sheet having two opposed faces wherein each face has a lightweight sheet material attached to it, wherein the polymer sheet can be punctured and penetrated by fastening means and the polymer sheet is deflected snugly around the fastening means where the sheet is punctured so that the sheet provides resistance to removing the fastening means. The polymer sheet may comprise polyamide, polystyrene, polyvinyl chloride, polyester, or acrylic, and has a preselected thickness in the range of 30 to 50 mils.

5 Claims, 1 Drawing Sheet

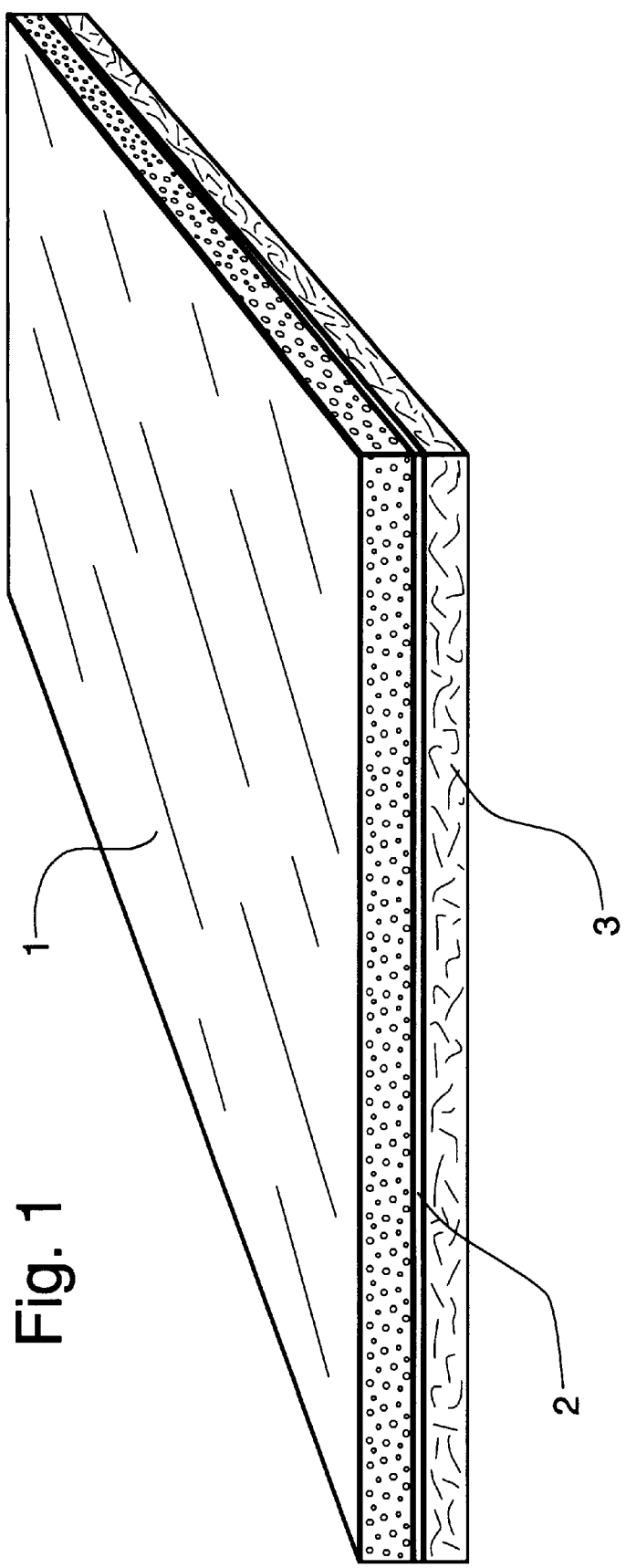

COMPOSITE CONSTRUCTION BOARD WITH LOAD BEARING PROPERTIES

BACKGROUND OF THE INVENTION

Field of the Invention

This invention relates to lightweight composite boards. More particularly, this invention is concerned with making lightweight boards such as insulation, acoustical sheets and sheathing materials which are capable of being fixed even to the corners of house frames using such fastening means as nails, staples and screws.

Specific types of lightweight boards which are used in construction are incapable of bearing fasteners such as nails, staples and screws. Many of these boards tend to have a high porosity. More importantly, they fail to provide the grasping needed when fasteners penetrate the boards. These boards, furthermore, cannot be used to bear fasteners which are inserted for various needs such as hanging siding on houses.

Such lightweight boards cannot be used at the corners of house frames. Such boards not only cannot be nailed or stapled, but they also fail to provide the bracing needed especially in such locations. Typical of such boards are insulating panels and acoustical, sound absorbing panels.

It is an object of the present invention to provide lightweight, composite boards which are capable of being securely fastened by such means as nails, screws, and staples.

It is a further object of this invention to provide lightweight, composite boards which are load bearing boards. Another object is to provide such lightweight composite boards that are capable of being a good substrate for residential siding materials. Another object is to provide lightweight composite boards which can be used as sheathing. These and other objects are achieved by the invention described herein.

SUMMARY OF THE INVENTION

A composite board which can be fastened by fastening means. The board is characterized in that the fastening means can penetrate and go through the board from one face to the other, opposite face and be held securely by the board. The composite board comprises a polymer sheet having two opposed faces wherein each face has a lightweight sheet material attached to it, wherein the polymer sheet can be punctured and penetrated by fastening means and as the polymer sheet is penetrated by the fastening means, the polymer sheet will deflect snugly around the fastening means where the sheet is punctured so that the sheet provides resistance to removing (retracting) the fastening means, wherein further the polymer sheet is sufficiently rigid throughout the sheet and around the fastening means to firmly hold the fastening means in place. One face of the polymer sheet (face A) can have one lightweight sheet material attached to it, and the other face (face B) can have a different type of lightweight sheet material attached to it.

DESCRIPTION OF THE DRAWING

FIG. 1 shows a composite board of the present invention. The polymer sheet (2) is sandwiched between a lightweight sheet material (1) and another lightweight sheet material (3). In the figure, the lightweight sheet materials are different, although if desired they could be made of the same material. Putting the polymer sheet (2) as an inner layer between two lightweight sheet materials provides extra stability and reduces the danger that the polymer sheet will pull loose from the lightweight sheet material. It also guards against condensation of moisture on the polymer sheet.

DETAILED DESCRIPTION

The lightweight sheet material on each side of the polymer sheet can be any lightweight board such as insulative or acoustical sheets. Such sheets can be fibrous or made of fiber and binder. Filler can also be included. Alternatively, the lightweight sheet material can be polymeric such as polymer foam. These lightweight boards can be insulation board such as expanded polystyrene, extruded polystyrene, polyethylene foam, polypropylene foam, laminated fiber, and polyisocyanurate. Acoustical and sheathing boards can also be used. The lightweight sheet material is attached to the polymer sheet by suitable means (such as, for example, by adhesive). The thickness of the lightweight sheet material is not critical. It can be as thin as about 10 mils or as thick as 1.5 inches.

While fasteners such as nails, screws, and staples can go through the lightweight boards, these lightweight boards are ordinarily unable to retain the fastener or bear any load. By themselves the lightweight boards typically provide no resistance to the retraction of the fastening means. If an attempt is made to nail the lightweight boards in place, the nail normally pulls away from or pulls through the lightweight board. By using the polymer sheet, however, a lightweight composite board can be obtained which can retain such fasteners. The composite obtained is thus made capable of being nailed, screwed, or stapled to fix the board in place as needed. Preferred embodiments can even bear a load, permitting materials such as siding to be fixed to it.

The polymer sheet in the middle comprises polymer and plasticizer. It can also include fiber and filler and other ingredients typically found with polymers such as antioxidants, pigments, and modifiers.

The polymer sheet is characterized in that it allows the fastener to puncture and penetrate the sheet while, at the same time, the sheet deflects snugly around the fastening means. The action of the sheet in snugly fitting around the fastener as it goes through the sheet provides some resistance to the subsequent removal of the fastener in the opposite direction. In addition to this, the polymer sheet should have an effective amount of rigidity both throughout the sheet and around the fastening means which also serves to support the fastener and resist its removal. The sheet's deflection around the penetrating fastener and the rigidity of the sheet together can provide the sheet with an effective amount of hold to grasp the fastening means and resist its removal. The resistance to the removal of the fastening means is at least sufficient to enable the composite board to be fastened in place using fastening means. Suitably the polymer sheet provides at least about 5 pounds of resistance to the removal of the fastening means ("nail pull") from the layered composite.

With a minimum nail pull of at least 5 pounds in a composite sheet the present composites can easily be used in place of dry wall, or can even be attached to framing to decrease racking on a building structure. This minimum nail pull is easily obtained with the composite sheets of the present invention. A more preferred minimum nail pull is at least about 10 pounds and most preferably there is at least about 15 pounds of resistance to the removal of the fastening means ("nail pull") from the layered composite sheets of the present invention.

Polymers, copolymers, and mixtures thereof can be used to form the polymer sheet used to prepare the lightweight composite boards of the present invention. Polymers which are preferred and which can be formulated to form the polymer sheets are polyamide, polystyrene, polyvinyl chloride, polyester, and acrylic. Vinyl polymers form rigid sheets which are preferred for use as the polymer sheet of the present lightweight composites. Polyvinyl chloride (PVC) is most preferred. In fact, it has been noted that recycled PVC is particularly suitable as the polymer sheet. Any discoloration of the recycled polymer does not have any effect since in the center it cannot be seen. Soft polymers (made soft frequently by the level of plasticizer) are sometimes not sufficiently rigid to give the composite the minimum effective hold. Such composites will not have a suitable minimum nail pull. Many formulations of polyetheylene, for example, lack the rigidity needed in the polymer sheet to give it a minimum effective hold to grasp the fastening means and resist its removal. Such formulations of polyethylene will not give a minimum of 5 pounds nail pull to the composite.

As long as the sheet can be penetrated by the fastening means and provides that minimum effective hold the thickness of the sheet is not critical. The limit for the maximum thickness is more one of practicality. The polymer sheet is likely to be expensive, and it is better to limit the thickness of the sheet. A maximum preferred thickness is about 65 mils. A more preferred thickness is a maximum of about 50 mils. The polymer sheet should be thick enough to provide a minimum effective hold to grasp the fastening means and resist its removal. To some extent the minimum thickness of the polymer sheet will depend on the minimum amount of shear which the finished board must bear, and on the minimum amount of force which the fastening means must bear in resisting its removal from the finished composite board. For many needs a polymer sheet thickness of at least about 20 mils will be sufficient. More preferably, however, the polymer sheet will have a minimum thickness of at least about 25 mils. For some embodiments where nail pulls in excess of about 20 pounds are desired, a minimum thickness of about 30 mils can be used. Thus, certain preferred embodiments have the polymer sheet thickness in the range of from about 30 to about 50 mils thick.

EXAMPLES

To test the nail pull resistance of various embodiments of the present invention, sheets of polystyrene foam from Dupont were used as both outer layers and four different polymer sheeting materials were tested as the inner layer (2). With these materials, four different samples of the layered sheet composite of the present invention were made. In each case a nail was driven through the sample, and the force needed to retract (withdraw) the nail was measured (the "nail pull" was tested in each sample).

1) The first composite had a 30 mil thick rigid polystyrene polymer sheet in the middle. The polystyrene sheet had a single layer of clay-coated kraft paper covering one side of the polymer sheet. It was found that 12 pounds of force was needed to remove a nail which had been driven into the composite (the composite had a 12 pound nail pull).

2) The second composite had a 30 mil thick rigid polystyrene polymer sheet in the middle. The polystyrene sheet was plain, with no paper layer on it. It was found that 15 pounds of force was needed to remove a nail which had been driven through the composite (a nail pull of 15 pounds).

3) The third composite had a 20 mil thick polyamide and fiberglass blend sheet at the center. It was found that 8 pounds of force was needed to remove a nail that had been driven through the composite (a nail pull of 8 pounds).

4) The fourth composite had a 27 mil thick PVC sheet as the inner layer (2). It was found that 18 pounds of force was needed to remove a nail that had been driven through the composite (a nail pull of 18).

We claim:

1. A composite board for use in building construction and adapted to be attached to a building with fasteners, said composite board comprising:

a polymer sheet having two opposed faces and being formed of a thickness and polymer composition that are preselected such that penetration of said polymer sheet by a fastener causes said polymer sheet to deflect around the fastener, said composite board having a predetermined retraction resistance and a predetermined capacity to bear a load carried by the fastener;

a first sheet of material being attached to one of said opposed faces of said polymer sheet;

a second sheet of material being attached to the other one of said opposed faces of said polymer sheet;

said composite board being securable to the building with the fasteners extending through said first sheet of material, said polymer sheet and said second sheet of material so as to completely penetrate said composite board and, when so secured, providing a load bearing panel to which an ancillary facade can be attached; and wherein said preselected thickness of said polymer sheet is in the range of from about 30 to about 50 mils and wherein said preselected polymer composition is selected from the group consisting of polyamide, polystyrene, polyvinyl chloride, polyester, and acrylic, said thickness and polymer composition in conjunction with said first and second sheets providing a retraction resistance of at least about 15 pounds.

2. A composite board as claimed in claim 1 wherein said first sheet of material is thermally insulative.

3. A composite board as claimed in claim 1 wherein said first sheet of material is an acoustical fibrous sheet.

4. A composite board as claimed in claim 1 wherein said preselected polymer composition is selected from the group consisting of polyvinyl chloride and polystyrene.

5. A composite board as described in claim 4 wherein said preselected polymer composition is recycled polyvinyl chloride.

* * * * *

UNITED STATES PATENT AND TRADEMARK OFFICE
CERTIFICATE OF CORRECTION

PATENT NO. : 6,177,180 B1  
DATED : January 23, 2001  
INVENTOR(S) : Bodine et al.

Page 1 of 1

It is certified that error appears in the above-identified patent and that said Letters Patent is hereby corrected as shown below:

Abstract,
Line 2, "op site" should be changed to -- opposite --.

Signed and Sealed this

Eleventh Day of September, 2001

*Attest:*

*Attesting Officer*

NICHOLAS P. GODICI  
*Acting Director of the United States Patent and Trademark Office*